(12) United States Patent
Hetager

(10) Patent No.: US 9,181,758 B2
(45) Date of Patent: Nov. 10, 2015

(54) DIAMOND CORE DRILL WIRE LINE LATCH ASSEMBLY

(71) Applicant: Leroy G. Hetager, Indiana, PA (US)

(72) Inventor: Leroy G. Hetager, Indiana, PA (US)

( * ) Notice: Subject to any disclaimer, the term of this patent is extended or adjusted under 35 U.S.C. 154(b) by 0 days.

(21) Appl. No.: 14/516,925

(22) Filed: Oct. 17, 2014

(65) Prior Publication Data

US 2015/0114723 A1    Apr. 30, 2015

Related U.S. Application Data

(60) Provisional application No. 61/897,873, filed on Oct. 31, 2013.

(51) Int. Cl.
| | | |
|---|---|---|
| *E21B 17/07* | (2006.01) | |
| *E21B 23/02* | (2006.01) | |
| *E21B 25/00* | (2006.01) | |
| *F16B 21/16* | (2006.01) | |

(52) U.S. Cl.
CPC .................. *E21B 17/07* (2013.01); *E21B 23/02* (2013.01); *E21B 25/00* (2013.01); *F16B 21/165* (2013.01); *Y10T 403/592* (2015.01); *Y10T 403/599* (2015.01)

(58) Field of Classification Search
CPC ..... E21B 23/02; E21B 17/02; Y10T 403/592; Y10T 403/599; F16B 21/165
See application file for complete search history.

(56) References Cited

U.S. PATENT DOCUMENTS

| | | | |
|---|---|---|---|
| 3,430,699 A * | 3/1969 | De Cuir | 166/217 |
| 4,023,620 A * | 5/1977 | Gazda et al. | 166/217 |
| 4,149,593 A * | 4/1979 | Gazda et al. | 166/113 |
| 4,583,591 A * | 4/1986 | Krause et al. | 166/217 |
| 4,834,198 A | 5/1989 | Thompson | |
| 5,092,402 A * | 3/1992 | Perricone et al. | 166/113 |
| 5,366,313 A * | 11/1994 | LaBarre | 403/108 |
| 5,788,401 A | 8/1998 | Drenth | |
| 5,934,393 A | 8/1999 | Marshall | |
| 6,029,758 A | 2/2000 | Novacovicci et al. | |
| 6,089,335 A | 7/2000 | Able | |
| 6,109,373 A | 8/2000 | Able | |
| 6,371,205 B1 | 4/2002 | Langan et al. | |
| 6,379,072 B1 * | 4/2002 | Brown et al. | 403/31 |
| 6,425,449 B1 | 7/2002 | Marshall | |
| 6,564,885 B2 | 5/2003 | Attwater | |
| 2003/0143021 A1 * | 7/2003 | Whalen | 403/322.2 |
| 2003/0234106 A1 * | 12/2003 | Surjaatmadja | 166/308 |
| 2006/0278402 A1 * | 12/2006 | Mullins | 166/380 |
| 2009/0226248 A1 * | 9/2009 | Wang | 403/322.2 |
| 2010/0126734 A1 * | 5/2010 | Eriksen | 166/385 |
| 2010/0206583 A1 * | 8/2010 | Swietlik et al. | 166/380 |
| 2011/0079436 A1 * | 4/2011 | Drenth et al. | 175/58 |
| 2012/0012338 A1 * | 1/2012 | Blanton et al. | 166/382 |
| 2012/0291904 A1 * | 11/2012 | Eckardt et al. | 138/109 |
| 2013/0336719 A1 * | 12/2013 | Baus | 403/379.5 |

* cited by examiner

*Primary Examiner* — Daniel P Stodola
*Assistant Examiner* — Jonathan Masinick
(74) *Attorney, Agent, or Firm* — McKay & Associates, P.C.

(57) ABSTRACT

A latch assembly for a diamond core drill wire line. Included is a cylindrical main body having a main body interior, an outer wall, a main body end and a latch end. A ball hole is defined through the main body. An inner shaft ball lock is contained within the main body. A spring is disposed on the inner shaft ball lock. A main body top is attached to the main body end to contain the inner shaft ball lock within the main body and limit upstream movement of the inner shaft ball lock. A steel ball is then captured between the inner shaft ball lock and the outer wall of the main body such that upon axial movement of the inner shaft ball lock the ball penetrates up through the outer wall to extend past the main body to thereby latch onto an outer tube assembly.

14 Claims, 4 Drawing Sheets

DIAMOND CORE DRILL WIRE LINE LATCH ASSEMBLY

CROSS-REFERENCE TO RELATED APPLICATIONS

The instant application claims benefit of provisional application Ser. No. 61/897,873 filed Oct. 31, 2013, the contents of which are incorporated herein by reference.

BACKGROUND

1. Field of the Invention

The instant invention relates to wire line core retrieval systems for diamond drilling exploration.

2. Description of the Related Art

Core barrels are used frequently in mineral exploration, where the coring may be several hundred to several thousand feet in length. Exploration diamond core drilling utilizes an annular diamond-impregnated drill bit attached to the end of hollow drill rods to cut a cylindrical core of solid rock. The core samples are recovered and examined for mineral percentages and stratigraphic contact points.

Core barrels comprise generally three main components, including a barrel head, outer steel tube to which the core bit is attached and an inner tube which is attached to the barrel head via a set of bearings. The outer tube or outer barrel rotates with the core bit attached to it and cuts the core, whereas the inner barrel on its bearings does not rotate so that the core entering the inner barrel is not disturbed. At the bit end of the inner barrel is a core retainer box and spring, which holds the core inside the barrel while the barrel is pulled out of the hole. If the core is still attached to the bottom of the bore hole it will grip the core firm enough for the barrel to be pulled back and snap the core from the bottom of the hole. Once the core barrel is full, the drill rods and barrel are pulled out of the hole and the core is removed.

Wire-line coring is the act or process of core drilling with a wire-line core barrel. In wireline drilling the barrels work the same way except the drill rods used with this barrel are thin wall tubes of the same outside and inside diameters as the outer tube of the barrel, and the inner barrel with its barrel head containing the bearing are lowered down inside the drill rods by means of a device called an overshot. When the barrel is full of core the overshot is lowered down inside the rods and latches onto the inner barrel at the same time the inner barrel locking latches are released and the inner barrel with its core are pulled out by the winch line. As a result, wireline core drilling is a faster process of recovering the core, eliminating the time consuming process of retrieving the core barrel every time it is full of core.

Since the drill strings in wireline coring are made up of various tubes, only the outer of which is rotating, certain coupling mechanisms must be employed. To removably retain the core barrel inner tube assembly adjacent to the core bit a locking coupling must be utilized. In the prior art, the outer tube assembly is composed of an adaptor coupling that is threadedly connected to the core barrel outer tube to provide a recess in which a landing ring (drill string landing shoulder) is mounted, a remaining shell connected to the inner (lower) end of tube and an annular drill bit at the inner end of the reaming shell for drilling into the earth formation from which the core sample is taken. The outer end of the assembly includes a locking coupling that connects the adaptor coupling to the adjacent pipe section of the drill string. At the opposite end of the coupling from the pipe section, the locking coupling, in conjunction with the annular recess of the coupling, forms a latch seat inside of the surface of the adaptor coupling against which the latches are seatable for removably retaining the core barrel inner tube assembly adjacent to the core bit. In the prior art, the latch assemblies comprise pivotal, spring-loaded arms which are in axial relationship to the core barrel inner tube.

SUMMARY

It is the objective of the instant invention to provide a wireline core drilling assembly having a lowering and retrieving system which eliminates the potential for damage when the inner barrel hits the bottom of the landing seat.

It is further an objective of the invention to allow for the locking of the inner core barrel with a one or two piece core retriever.

It is further an objective to allow for the use of a simple outer barrel that does not require many different threads and which can use worldwide standard, straight drill rods used as the outer barrel so as to not make the system any weaker.

It is further an objective to use a one thread system to produce straighter drill rods, with one foot on top and bottom, with diamonds or carbide spaced the same size as the diamond core bit attached to lower stabilizer.

It is further an objective to use a system through which water pressure is maintained even in the instance of core blocking.

It is further an objective to use a system wherein the latch assembly is locked by a means other than pivotal, spring-loaded arms.

It is further an objective to use a system which is adaptable to different size drill strings.

Accordingly, the invention comprehends a latch assembly, including a cylindrical main body having a main body interior, an outer wall, a main body end and a latch end. A ball hole is defined through the main body. An inner shaft ball lock is contained within the main body underlying the ball hole. A roll pin is secured to the main body and within the main body interior positioned trans-axially and bisecting the main body. In this manner the roll pin is positioned downstream of the inner shaft ball lock and adapted to be abutted by an outer end of the inner shaft ball lock to limit downstream movement of the inner shaft ball lock. Next, a spring having a first end and a second end is disposed on the inner shaft ball lock. A main body top is attached to the main body end and includes a circular outer portion and a threaded inward portion concentric thereto, configured to be connected within the main body near the main body end to contain the inner shaft ball lock within the main body and limit upstream movement of the inner shaft ball lock. A steel ball is then captured between the inner shaft ball lock and the outer wall of the main body such that upon axial movement of the inner shaft ball lock the ball penetrates up through the outer wall to extend past the main body to thereby latch onto an outer tube assembly.

DETAILED DESCRIPTION OF THE PREFERRED EMBODIMENT

Figure 1:
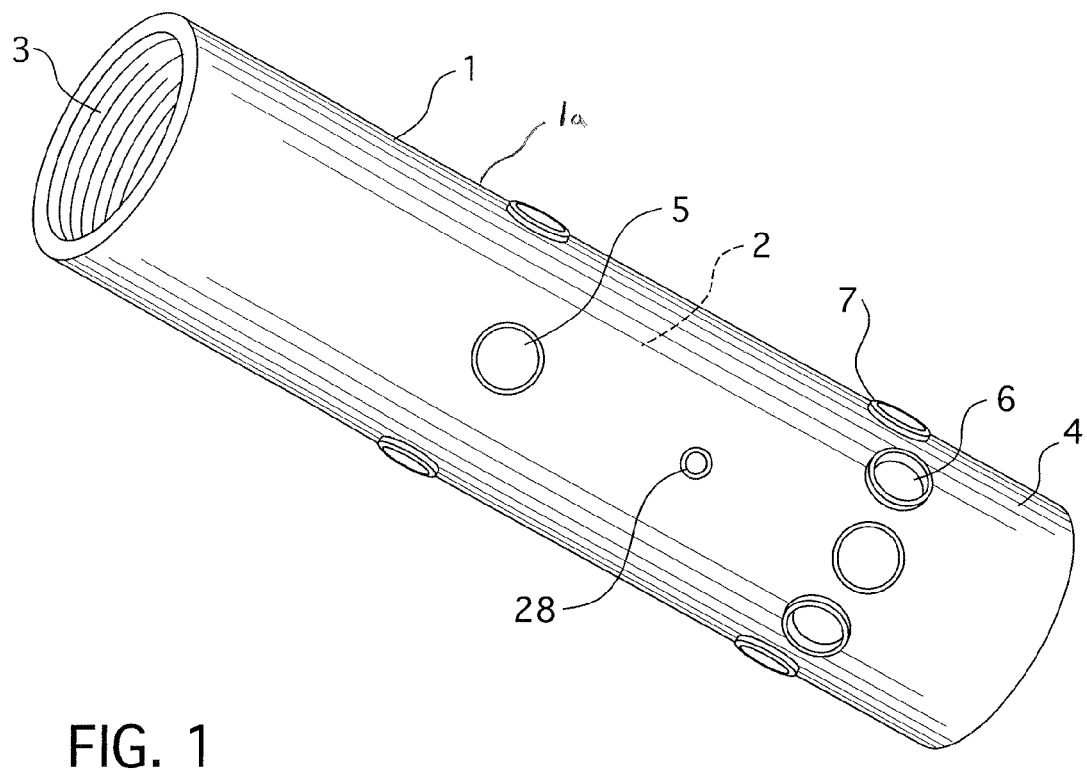
FIG. 1 shows a perspective view of the main body of the instant latch assembly.
Figure 2:
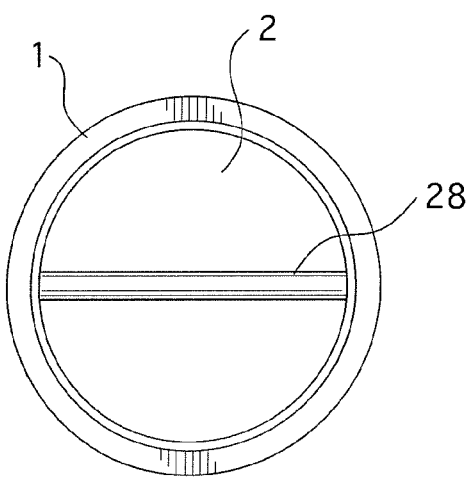
FIG. 2 shows a top view in elevation of the main body of the latch assembly.

In a conventional manner, a hollow drill string extends downwardly into a bore hole and is made up of a series of interconnected hollow drill rods (not shown) through which fluid is pumped under pressure into the outer end of the drill string (not shown). The portion of the drill string attached to or extended below the pipe (rod) section is commonly referred to as a core barrel outer tube assembly (not shown). As is known in the art, the core barrel outer tube assembly would then fasten to a reamer or reaming shell, further onto which a bit is attached at the "bit end" of the drill string. For purposes of this invention, the core barrel outer tube assembly by definition includes the reamer and/or any outer tube assembly component, herein outer tube assembly. The core barrel outer tube assembly additionally receives and retains a core barrel inner tube assembly, which is retained adjacent to the core bit. But since the drill strings in wireline coring are made up of various tubes, only the outer of which is rotating, certain coupling mechanisms must be employed. Therefore, the instant latch assembly is attached to by swivel means to the core barrel inner tube assembly and can remain stationary therewith, while also being adapted to attach to the rotating reamer to thereby engage core barrel outer tube, or by definition the reamer, as further described.

Referencing then FIGS. 1-6, latch assembly includes a cylindrical main body 1 having a main body interior 2, an outer wall 1a, a main body end 3, and a latch end 4. The latch end 4 is at the upstream end of main body 1, and the main body end 3 is the downstream end of main body 1. Downstream as used herein means that portion of any drill string component that is most axially downward into the bore hole, away from the surface, whereas upstream throughout means upward along the string, most proximate to the surface. For instance, core barrel inner tube 31 is upstream from latch coupling 21 (see FIG. 6).

A ball hole 6 is defined through the main body 1, i.e. from the outer wall 1a into the interior 2. As shown, multiple ball holes 6 are defined, although it should be understood that the number may vary. "A" as used in the claims in relation to all components means one or more. An insert 7 is situated within each ball hole 6. The inserts 7 are replaceable such that upon wear they may be interchanged. Each ball hole 6 is sized and shaped to receive a steel sphere or ball 8, their function to be further described.

Figure 3:
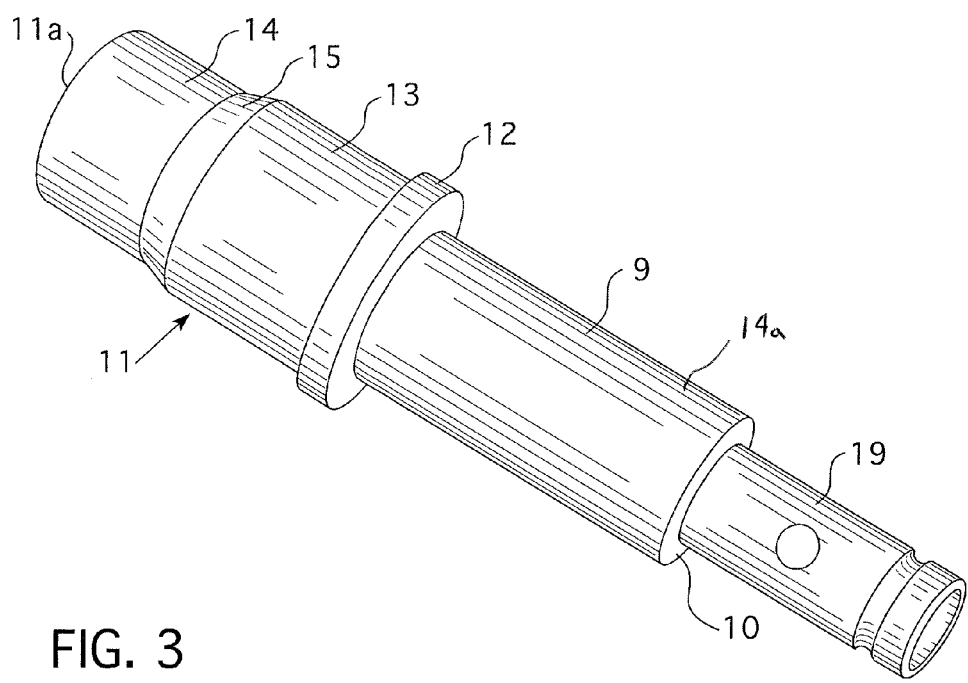
FIG. 3 shows a perspective of the inner shaft ball lock.
Figure 4:
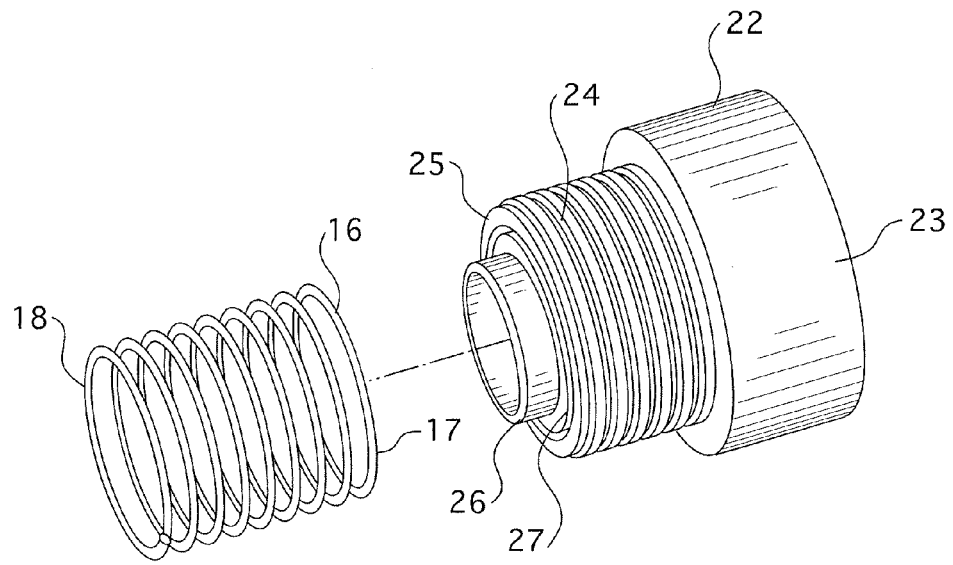
FIG. 4 shows a perspective view of the main body top with spring.
Figure 5:
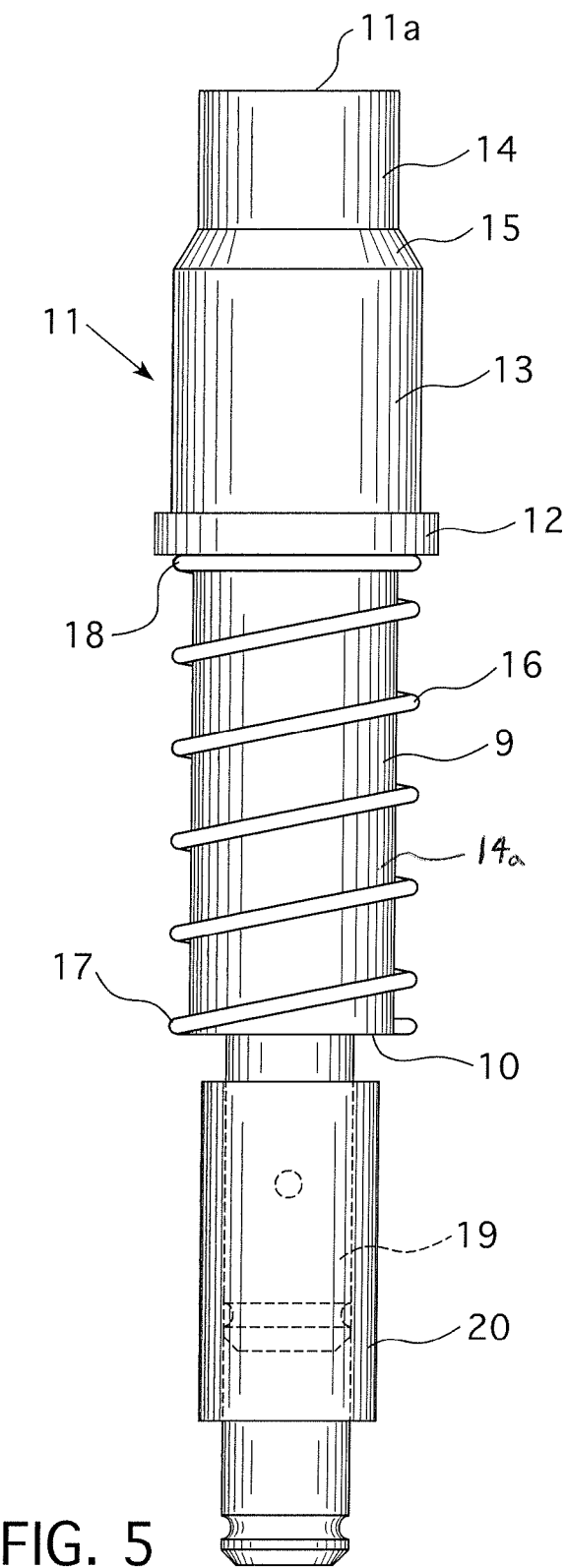
FIG. 5 shows a side view in elevation of the inner shaft ball lock with the spring attached thereto.
Figure 6:
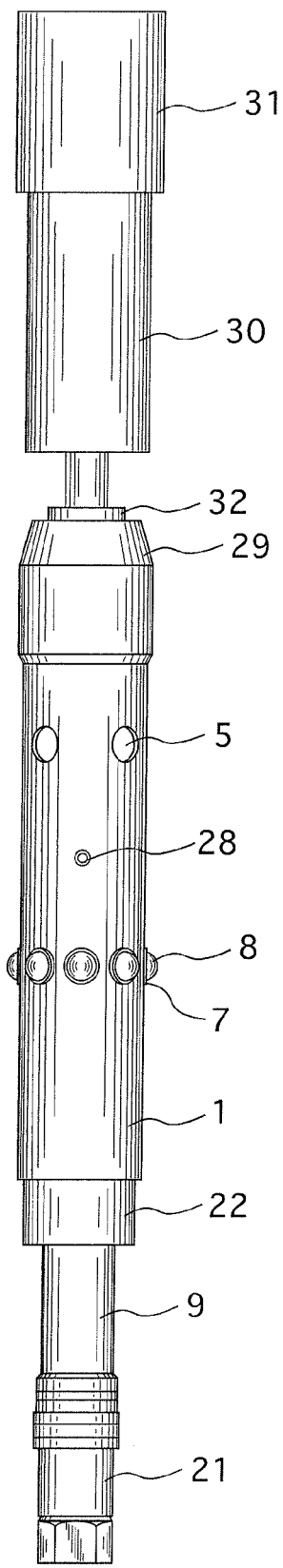
FIG. 6 shows a side view in elevation of the latch assembly as would be attached to a core inner barrel and landing seat.

An inner shaft ball lock 9 is contained within the main body 1 underlying the ball hole 6. The inner shaft ball lock 9 as shown by FIGS. 3 and 5 is a generally elongate pin having a distal end 10 and a proximal end 11. The proximal end 11 is configured to underlie the ball hole 6 upon assembly. Additionally, the proximal end 11 is upstream relative to distal end 10 and is defined by a large abutment portion 13 and a small abutment portion 14. The large abutment portion 13 extends from a ball flange 12 then angles and transitions downward by way of declined transition surface 15 to the small abutment portion 14. As shown, each abutment portion 13, 14 is cylindrical and axially aligned with each other with the small abutment portion 14 having a smaller diameter relative to the large abutment portion 13. The annular ball flange 12 is integral with the large abutment portion 14 surface and generally separates the medial portion 14a of inner shaft ball lock 9 with proximal end 11. As such the ball flange 12 is defined towards the proximal end 11 integral to the inner shaft ball lock 9 having a flange diameter greater than a diameter of said inner shaft ball lock 9 (and proximal end 11) to extend therefrom.

Disposed on inner shaft ball lock 9 is a spring 16. Spring 16 has a first end 17 and a second end 18. Spring 16 is sized with a diameter such that it can ride over medial portion 14a of inner shaft ball lock 9. Axial translation of spring 16 is limited by second end 18 abutting the ball flange 12 on one side thereof (see FIG. 5). As a result, when the second end 18 is forced against ball flange 12 the spring 18 compresses.

Spring 16 is held into place along inner shaft ball lock 9 at first end 17 by providing main body top 22. Main body top 22 is a cap-like portion generally T shaped in cross-section configured to threadedly attach to the main body end 3, thereby packing spring 16. Main body top 22 has a circular outer portion 23 and a threaded inward portion 24 axially aligned therewith configured to be connected within the main body 1 near the main body end 3 to also contain the inner shaft ball lock 9 within the main body 1 and limit upstream movement of the inner shaft ball lock 9. As shown by FIG. 8, main body top 22 includes a spring face 25 defined along the inward portion 24 defining the surface perpendicular to inward portion 24. An annular spring seat 26 upstands from the spring face 25. A spring groove 27 is defined within the spring face 25 and is adapted to contain the first end 17 of the spring 16.

A rigid roll pin 28 is secured to main body 1 within main body interior 2, positioned transaxially and bisecting the main body 1. The roll pin 28 is positioned, when assembled, downstream of the inner shaft ball lock 9. As shown, the roll pin 28 is a small-diameter, elongate pin in the preferred embodiment although any type of larger pin or plate can be used within the interior 2 as a means for limiting the downstream movement of the inner shaft ball lock 9. Here, roll pin 28 is adapted to be abutted by an outer end 11a of the inner shaft ball lock 9 proximal end 11 to limit downstream movement of the inner shaft ball lock 9.

A (one or more) ball 8 is captured between the inner shaft ball lock 9 and the outer wall 1a of main body 1. The balls 8 preferably are steel spheres. The lower halves of each ball 8 can rest in tapered holes. At a minimum balls 8 are packed between inner shaft ball lock 9 and main body 1 such that they are free to rotate, but not translate axially. Balls 8 are sized to partially lift in and out of ball hole 6 but not be so small that they can be removed entirely from ball hole 6, for instance lifting just past the plane defined by outer wall 1a.

Additional components include a latch means comprising a latch seat 19 extending from the distal end 10 of the inner shaft ball lock 9. A pine tree 20 is seated on the latch seat 19. A latch coupling 21 is provided for attachment to the pine tree 20. A water hole 5 is defined through the main body 1 upstream from the ball hole 6 and upstream from the roll pin 28. The functions of these additional components are generally known, aiding in the attachment of the inner core barrel 31 with the outer tube assembly (not shown) and which might vary in size and type depending the size of the core, and the water holes 5 aide in fluid flow.

At the end of main body 1 opposite the main body top 22 is the landing seat 29. Annular landing seat bottom (closest to bit end) has defined through its interior a plurality of perforations (not shown) acting as the water way, thus an annual fluid chamber is defined between the inner core barrel (inner tube) and the outer tube to act as a passageway for water to function within the string as is known to vary pressure throughout. Landing seat 29 is generally replaceable and is situated inside the drill rod thread which in turn moves or stops the inner core barrel 31 swiveling about inner barrel swivel 30 and lock nut 32. The landing seats can be replaced when pulled out at the drill site to avoid having the components repaired off-site.

In use, with drill string downwardly extending into bore hole and pump apparatus pumping fluid under pressure into the outer end of the drill string in a conventional manner, and the core barrel outer tube assembly extending below the pipe (rod) section in a conventional manner, the inner core barrel 31 is inserted into the outer end of the drill string and, as the assembly moves inwardly (axially downwardly), by being lowered by a wire line overshot assembly (not shown), or is free falling through the drill string, during the inward movement, the balls 8 are retained in their retracted position within main body 1 resting on small abutment portion of inner shaft ball lock 9. As the inner core barrel 31 landing seats 29 seat on the drill string landing ring and pump-in pressure acting against the latch assembly, the force pushes the inner shaft ball lock 9 downward. As a result, the balls 8 are pushed upward through holes 6 as transition portion 15 raises the balls 8 up onto large abutment portion 13 such that balls 8 extend past outer wall 1a to be non-co-planar therewith. Therefore, axial movement of the inner shaft ball lock 9 allows the balls 8 to penetrates up through said outer wall 1a to extend past the main body 1 to thereby latch onto an outer tube assembly and/or reaming shell for engagement therewith because the outer tube assembly and/or reaming shell can be provided with any type of ball-receiving mechanism such as grooves, slots or gaps defined therein (not shown). Main body top 22 with spring 16 holds the inner shaft ball lock 9. Inner shaft ball lock 9 thus "plunges" through main body 1. Upon locking it acts as a means for securing steel balls which form a "ball-lock". Upper reaming shell would be joined to the inner end of the outer tube assembly to secure the drill bit. The lower reaming shell has no slots to avoid weakening.

After breaking the core in a conventional manner, a conventional wire line overshot assembly (not shown), is lowered or allowed to move axially inwardly to couple onto the overshot coupling device.

Cylindrical lifter case holds the core from falling out of the bottom of the inner core barrel. The lifter case is replaceable and the structure and function is generally known, e.g. secures and hold the core so that the core does not fall from the bottom of the inner core barrel. Thus, the inner core barrel with lifter case can be a standard ten (10) foot core barrel for holding the core, to be retrieved.

I claim:

1. A latch assembly, comprising:
   a cylindrical main body having a main body interior, an outer wall, a main body end and a latch end;
   a ball hole defined through said main body;
   an inner shaft ball lock contained within said main body underlying said ball hole;
   a roll pin secured to said main body and within said main body interior positioned transaxially and bisecting said main body, said roll pin positioned downstream of said inner shaft ball lock and abutted by an outer end of said inner shaft ball lock to limit axial movement of said inner shaft ball lock;
   a spring having a first end and a second end, said spring disposed on a medial portion of said inner shaft ball lock;
   a main body top attached to said main body end having a circular outer portion and a threaded inward portion axially aligned therewith configured to be connected within said main body near said main body end to contain said inner shaft ball lock within said main body and limit upstream movement of said inner shaft ball lock;
   a ball captured between said inner shaft ball lock and said outer wall of said main body such that upon axial movement of said inner shaft ball lock said ball penetrates up through said outer wall to extend past said main body to thereby latch onto an outer tube assembly; and,
   a ring-shaped ball flange, said ball flange encircling said inner shaft ball lock and defined towards a proximal end of said inner shaft ball lock and integral thereto, said ball flange having a flange diameter greater than both said proximal end and said medial portion of said inner shaft ball lock, wherein axial movement of said ball is limited by one side of said ball flange and axial translation of said spring is limited by an opposing side of said ball flange.

2. The latch assembly of claim 1, further comprising a replaceable insert situated within said ball hole to capture said ball.

3. The latch assembly of claim 1, wherein said proximal end of said inner shaft ball lock is defined by a large abutment portion and a small abutment portion, said large abutment portion extending from said ball flange then angling and transitioning downward by way of a declined transition surface to said small abutment portion such that small abutment portion has a smaller diameter relative to said large abutment surface.

4. The latch assembly of claim 1 further comprising a latch seat extending from said distal end of said inner shaft ball lock.

5. The latch assembly of claim 4, further comprising a pine tree seated on said latch seat.

6. The latch assembly of claim 5, further comprising a latch coupling for attachment to said pine tree.

7. The latch assembly of claim 1, further comprising a water hole defined through said main body upstream from said ball hole and upstream from said roll pin.

8. A latch assembly, comprising:
   a cylindrical main body having an outer wall, a main body interior, a main body end and a latch end;
   a ball hole defined through said main body;
   a replaceable insert situated within said ball hole;
   an inner shaft ball lock contained within said main body having a medial portion, a distal end and a proximal end, said proximal end underlying said ball hole;
   said proximal end defined by a large abutment portion and a small abutment portion, said large abutment portion extending from said ball flange then angling and transitioning downward by way of a declined transition surface to said small abutment portion such that small abutment portion has a smaller diameter relative to said large abutment surface;
   a roll pin secured to said main body and within said main body interior positioned transaxially and bisecting said main body, said roll pin positioned downstream of said inner shaft ball lock and abutted by an outer end of said proximal end of said inner shaft ball lock upon axial movement of said inner shaft ball lock;
   a ball captured between said proximal end of said inner shaft ball lock and said outer wall of said main body such that upon axial movement of said inner shaft ball lock said ball penetrates up through said outer wall to extend past said main body to thereby latch onto an outer tube assembly;
   a spring having a first end and a second end, said spring disposed on said inner shaft ball lock; and,
   a ring-shaped ball flange, said ball flange encircling said inner shaft ball lock and defined towards said proximal end of said inner shaft ball lock and integral thereto, said ball flange having a flange diameter greater than both said proximal end and said medial portion of said inner shaft ball lock, wherein axial movement of said ball is limited by one side of said ball flange and axial translation of said spring is limited by an opposing side of said ball flange.

9. The latch assembly of claim 8, further comprising a main body top attached to said main body end having a circular outer portion and a threaded inward portion concentric thereto configured to be connected within said main body near said main body end to contain said inner shaft ball lock within said main body, said main body top including a spring face defined along said inward portion and a spring seat upstanding from said spring face, such that axial movement of said inner shaft ball lock is limited by said roll pin and said spring.

10. The latch assembly of claim 9, wherein a spring groove is defined within said spring face adapted to contain said first end of said spring.

11. The latch assembly of claim 8, further comprising a latch seat extending from said distal end of said inner shaft ball lock.

12. The latch assembly of claim 11, further comprising a pine tree seated on said latch seat.

13. The latch assembly of claim 12, further comprising a latch coupling for attachment to said pine tree.

14. The latch assembly of claim 8, further comprising a water hole defined through said main body upstream from said ball hole and upstream from said roll pin.

\* \* \* \* \*